United States Patent

Ferree et al.

[15] 3,681,749
[45] Aug. 1, 1972

[54] METHOD AND APPARATUS FOR DETERMINING NEAR-SURFACE CORRECTIONS FROM SEISMIC DATA

[72] Inventors: Carman M. Ferree, Ponca City; Douglas F. Miller, Surrey Hills, both of Okla.

[73] Assignee: Continental Oil Company, Ponca City, Okla.

[22] Filed: Dec. 30, 1970

[21] Appl. No.: 102,624

[52] U.S. Cl. ........................................ 340/15.5 TC, 340/15.5 R, 340/15.5 DP, 340/15.5 MC
[51] Int. Cl. .............................................. G01v 1/28
[58] Field of Search ...... 340/15.5 MC, 15.5 TC, 15.5 TD, 340/15.5 DP, 15.5 CC

[56] References Cited

UNITED STATES PATENTS

| | | | |
|---|---|---|---|
| 3,323,104 | 5/1967 | Hadley et al. | 340/15.5 DP |
| 2,884,194 | 4/1959 | Evans | 340/15.5 TC |

OTHER PUBLICATIONS

Jakosky, Exploration Geophysics, 1950 " The Low Velocity Layer," pp. 714– 725.

Dobrin, Geophysics, Oct. 1942, pp. 393– 399, Vol. 7, " An Analytical Method of Making Weathering Corrections"

Primary Examiner—Benjamin A. Borchelt
Assistant Examiner—H. A. Birmiel
Attorney—Joseph C. Kotarski, Henry H. Huth, Robert B. Coleman, Jr., William J. Miller and David Hill

[57] ABSTRACT

A method and apparatus for determining near-surface corrections wherein a predetermined number of seismic waves are reflected from adjoining basement points and the arithmetic mean of the differences in times for an event on the parts of an n-fold stack is determined to represent the dip between two adjoining basement points, the dip being subtracted from each difference between the seismic wave travel times, one seismic wave being reflected from one basement point and the other seismic wave being reflected from an adjoining basement point. The differences thus determined substantially represent the difference between the effect of the near-surface layer beneath the adjacent receptor or source positions. The arithmetic mean of these differences is then utilized to determine a total time static correction factor.

15 Claims, 7 Drawing Figures

PATENTED AUG 1 1972　　　　　　　　　　3,681,749

INVENTORS
CARMAN M. FERREE &
DOUGLAS F. MILLER

BY
Dunlap, Laney, Hessin & Dougherty
ATTORNEYS

BEFORE STATIC CORRECTION

AFTER STATIC CORRECTION

INVENTORS
CARMAN V. FERREE &
DOUGLAS F. MILLER

BY
ATTORNEYS

BEFORE STATIC CORRECTION    AFTER STATIC CORRECTION 3,681,749

METHOD AND APPARATUS FOR DETERMINING NEAR-SURFACE CORRECTIONS FROM SEISMIC DATA

BACKGROUND OF THE INVENTION

1. Field of the Invention

This invention relates generally to improvements in wave propagation methods for determining the earth's structure and, more particularly, but not by way of limitation, to a method and apparatus for determining near-surface corrections from seismic data.

2. Description of the Prior Art

In seismic surveying, a seismic impulse is generated at or near the surface of the earth, and a portion of the impulse propagates downwardly through the various lithological formations and is reflected back to the surface by the interfaces between layers or beds of differing seismic energy characteristics. These reflected waves are recorded at the surface by geophones and recorded against elapsed time to produce what is generally known in the art as a seismogram. A seismogram thus provides basically the two-way travel time required for the seismic energy to propagate downwardly to the various interfaces and be reflected back to the surface.

The reflected wave traces recorded at various receptor or geophone positions are then interpreted to yield information relating to the lithology of the earth. Since the reflected wave traces are recorded against elapsed time, it is important that each trace is correctly positioned relative to the other traces, otherwise the composite of the reflected traces, known in the art as a "-time-section," might indicate a fictititious fault or fictitiously oriented interface.

Various mathematical techniques involving to some extent empirical data have been developed to determine an accurate "time correction factor." The "time correction factor" is then utilized to shift the recorded reflected waves traces in such a manner as to compensate for recorded wave travel time through regions of the subsurface having differing velocity characteristics. In essence, the time correction factor has been utilized to shift the reflected wave traces in such a manner that each wave trace is properly positioned or oriented relative to the various other reflected wave traces in a time-section. For example, the reflected wave traces are generally shifted in accordance with certain geometrical considerations, and more recently, various solutions have been proposed to correct the reflected wave traces in accordance with the velocity component of the near-surface layer of the earth. It should be noted that generally the velocity component of the near-surface layer is lower as compared to the velocity component of the sedimentary layers; however, in some instances, the velocity component of the near-surface layer has been determined to be higher.

The above mentioned reflected wave trace correction considerations, are rendered additionally complex to accurately determine by the fact that a particular subsurface interface may be inclined with respect to the earth's surface, or at least not horizontally oriented with respect thereto. This type of interface is commonly referred to in the art as a "dipping interface."

One solution which has been utilized in the past was to create a seismic event by discharging an explosion at a particular depth in a hole in the earth. Utilizing the data determined from this method, the rate of travel or velocity of a seismic wave through the near-surface layer generally between the explosion and the earth's surface was then utilized to determine a time correction factor which assumedly considered the lower velocity component of the near-surface weathering layer at that particular receptor location. The method generally described above, although acceptable for some purposes, had the disadvantages of, among other things, requiring a great deal of set-up time and field operation time, and included the inherent assumption that the hole was drilled at a sufficient depth such that the charge was exploded at a position below the near-surface layer.

It should also be noted that in geophysical prospecting today, seismic events are generally generated at the earth's surface. One example of the type of method and apparatus presently utilized to generate seismic events or seismic sweep signals at the earth's surface has been described in it's various aspects in U.S. Pat. Nos. 2,688,124; 2,808,577; 2,874,795; 2,910,134; 2,984,928; and 3,300,754, all of which are assigned to the assignee of the present invention, and thus further detailed description of this type of apparatus is not necessary herein.

Utilizing the method of geophysical prospecting wherein seismic events are generated at the earth's surface, known down-hole data was, of course, no longer available to determine a time correction factor.

There has thus developed in the art of geophysical prospecting a need for a method to correct reflected seismic wave traces in a fast, efficient and more accurate manner.

SUMMARY OF THE INVENTION

The present invention contemplates a method and apparatus for determining a total static correction factor to be utilized to shift recorded seismic wave traces such that each recorded wave trace is properly positioned relative to the other recorded wave traces in a time-section. After each seismic wave trace, recorded at various receptor positions, has been corrected for normal moveout, a plurality of differences between the seismic wave travel time of the recorded wave traces reflected from adjoining basement points are determined. The arithmetic mean of these differences is then determined and subsequently utilized as the dip between the two adjoining basement points. The dip is then subtracted from each determined difference between the seismic wave travel times reflected from the adjoining basement points to determine the difference between the near-surface layer effect beneath one predetermined receptor position and the near-surface layer effect under a second predetermined receptor position. The arithmetic mean of the differences between the near-surface layer effect beneath one predetermined receptor position and the near-surface layer effect under the second predetermined receptor position is then determined for various positions on the earth's surface and the differences thus determined are then utilized to shift the various recorded seismic wave traces of a particular time-section.

One object of the invention is to provide a method for more accurately correcting the seismic wave traces.

Another object of the invention is to provide a method for correcting seismic wave traces wherein the effect of the near-surface layer is more accurately determined and considered.

One further object of the invention is to provide a method for correcting the seismic wave traces wherein the dip of a particular subsurface interface is more accurately determined and the seismic wave traces are more accurately corrected in a manner considering such dip.

One additional object of the invention is to provide improved apparatus for correcting seismic wave traces wherein the effect of the near-surface layer is more accurately and efficiently determined.

Another object of the invention is to provide an improved machine process for more accurately correcting seismic wave traces.

Other objects and advantages of the invention will be evident from the following detailed description when read in conjunction with the accompanying drawings which illustrate the method and apparatus of the present invention.

DESCRIPTION OF THE PREFERRED EMBODIMENTS

Figure 1:
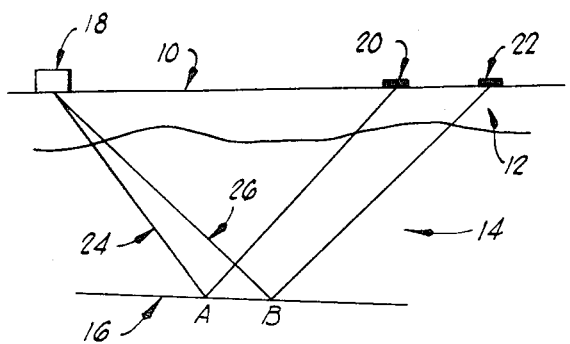
FIG. 1 is a partial, diagrammatical view of a typical geophysical prospecting arrangement showing seismic waves propagated from a single source, reflected from a subsurface interface, and being received by two receptors.
Figure 2:
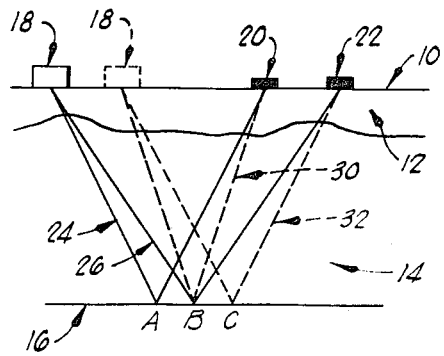
FIG. 2 is a partial, diagrammatical view showing a typical geophysical prospecting arrangement, similar to FIG. 1, but showing seismic waves propagated by two sources, reflected from a subsurface interface, and being received by two receptors.
Figure 3:
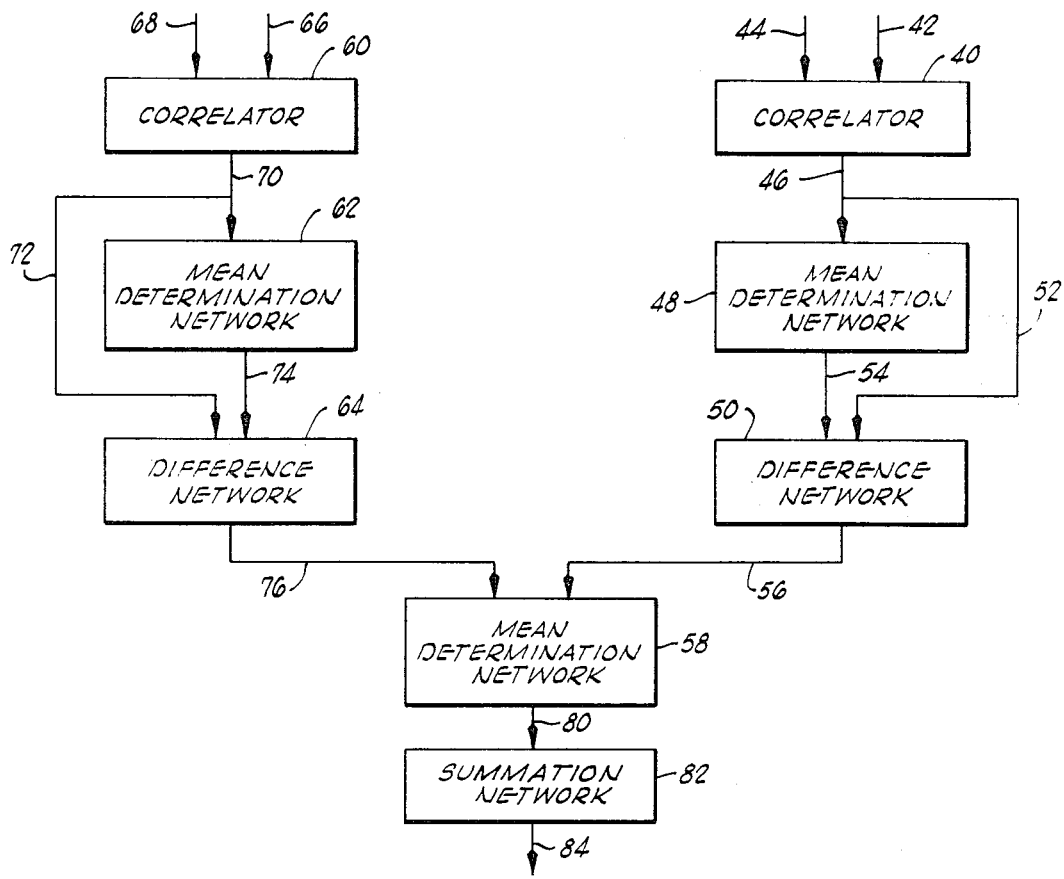
FIG. 3 is a block-diagram illustrating an analog apparatus adapted to correct seismic wave traces utilizing the method of the present invention.

Referring more particularly to the present invention, as will be described in detail below, the method and apparatus are basically adapted to provide a more efficient and accurate method and apparatus for determining static corrections to be applied to seismic wave traces so that such seismic wave traces provide more accurate interpretive data with respect to the disposition of various subsurface interfaces or of the lithology being studied. Although, the description below and particularly as illustrated in FIGS. 1, 2 and 3, of the drawings, refer to and basically indicate a seismic event being developed or created at the earth's surface and, in general, refer to an earth model basically comprising a near-surface layer and a single, sedimentary layer above a particular subsurface interface, the method and apparatus of the present invention are also adapted to be effectively utilized to correct and analyze seismic wave traces in more complex zones or areas, as will become more apparent below. The simpler lithology illustrated in the drawings is shown therein primarily for the purpose of clarity of description. It should also be noted that the present method and apparatus are adapted such that they can be successfully utilized in geophysical prospecting work relating to, for example, what is known in the art as common-depth-point, continuous-profiling, seismic reflection data.

Diagrammatically shown in FIG. 1 is a particular section of earth having a surface designated by the general reference numeral 10. A near-surface layer 12 is shown immediately underlying the earth's surface 10 and a substratum or sedimentary layer 14 is interposed generally between the earth's surface 10 and a subsurface interface, shown in FIG. 1 and designated therein by the general reference numeral 16. It should be noted that the interface 16 is sometimes referred to in the art and below as a "basement" and particular points on that interface 16 are commonly referred to as "basement points."

Also, as diagrammatically shown in FIG. 1, a seismic energy source 18 is disposed on the earth's surface 10 and two receptors or geophones 20 and 22 are remotely disposed with respect to the source 18. The source 18 is adapted to create a seismic disturbance or event which generates a seismic signal downwardly and is reflected from the interface 16. The reflected wave trace is received and recorded by the receptors 20 and 22.

It should be noted that the component of the seismic wave which is propagated downwardly from the source 18 is generally referred to in the art as a "compressional wave," and the component of the seismic wave reflected upwardly from a particular subsurface interface to be received and recorded at a particular receptor position is generally referred to in the art as a "reflected wave." The recorded, reflected seismic wave at a particular geophone position is sometimes referred to in the art as a "reflected wave trace" or a "seismogram." For the purpose of clarity of description, the compressional wave generated by a particular source and the corresponding reflected wave will be referred to below as the "seismic wave," and the seismogram recorded at each geophone position will be referred to below simply as the "recorded seismic wave trace." It should also be noted that the combination of a plurality of recorded seismic wave traces relative to a particular area is referred to generally in the art and will be referred to below as a "time-section."

As well known in the art, a particular seismic wave will be reflected from a particular point on a subsurface interface at substantially the same angle at which the propagated, compressional wave encountered that particular point on the interface. In other words, the angle of incidence of a seismic wave is equal to the angle of reflection of that seismic wave with respect to a particular point on a particular interface. Referring more particularly, to FIG. 1, a seismic wave 24 is shown therein as being propagated from the source 18 and reflected from the interface 16 to the receptor 20 at a basement point on the interface 16, generally designated in FIG. 1 by the letter "A." A seismic wave 26 is shown in FIG. 1 as being propagated from the source 18 and reflected from the interface 16 to the receptor 22 at a basement point on the interface 16, generally designated in FIG. 1 by the letter "B."

It is apparent from the foregoing and from FIG. 1, that if it is assumed that the interface 16 is parallel to the surface 10, or in other words, is horizontally disposed, and assuming further that the velocity characteristics of the near-surface layer 12 and the sedimentary layer 14 are the same generally between the surface 10 and the interface 16, that the only difference in travel time for the seismic waves 24 and 26 would be attributable to the fact that the seismic wave 26 travels a further total distance with respect to the seismic wave 24. Utilizing the geometrical properties of the seismic waves, generally referred to above, it will be apparent to those skilled in the art that the two seismic waves 24 and 26 could be correlated or corrected to a common vertical. In other words, the seismic waves 24 and 26 are related to a common vertical travel time and under the assumption referred to above, the travel times for each seismic wave 24 and 26 would be substantially equal.

It will also be apparent to those skilled in the art, that under the assumptions referred to above, if the seismic waves 24 and 26 did have different travel times after being corrected to a common vertical travel path, that this difference in travel time between the seismic waves 24 and 26 would indicate a relative depth change between the basement point "A" and the basement point "B." This relative change in depth between two adjoining basement points is generally referred to in the art and will be referred to below as "dip."

However, as indicated in FIG. 1, the layers or sections interposed between the earth's surface 10 and the subsurface interface 16 actually comprise the near-surface layer 12 and the sedimentary layer 14. As a general rule, and in most geophysical prospecting situations, the velocity characteristics of the seismic wave traveling through the near-surface layer will differ with respect to the velocity characteristics of the seismic wave traveling through the sedimentary layer 14. It should also be noted that, as a general rule, the near-surface layer 12 has a relatively lower velocity component with respect to the seismic wave travel therethrough as compared to deeper formations, indicated in FIG. 1 by the sedimentary layer 14. However, in any event, the velocity components of the near-surface layer 12 will differ from the velocity component of the sedimentary layer 14, and thus if the recorded seismic wave traces at the receptor positions 20 and 22 are corrected in such a manner that the above described assumptions are inherent in the determination of the time correction factor, a fictitious recorded seismic wave trace or a fictitious interpretation thereof will most probably result.

Referring more particularly to the present invention, the static corrections, that is the time correction factor to be applied to each recorded seismic wave trace, are determined in a manner which more accurately compensates or considers both the different velocity component of the near-surface layer 12 and the dip of the subsurface interface 16. It is therefore apparent that after the above described static corrections have been applied to the recorded seismic wave traces, that the composite of the seismic wave traces, or in other words, the time-section will more accurately reflect lithology being studied.

In initially analyzing the seismic waves 24 and 26, or more particularly the respective recorded seismic wave traces thereof, each recorded seismic wave trace is corrected to relate to a vertical seismic wave travel path. The procedure for correcting recorded seismic wave traces to relate to a vertical travel path is commonly referred to in the art as "correcting for normal moveout," an in correcting the recorded seismic wave traces in this manner, a velocity component for the near-surface layer 12 and a velocity component for the sedimentary layer 14 are assumed, based primarily or generally on empirical data relative to the particular area being investigated. The procedure for correcting for normal moveout is well known in the art and further detailed description is not required herein.

After the correction for normal moveout, as described above, recorded seismic wave traces with the same source location and from adjoining basement points differ in arrival time principally due to the factors of dip, the differences in the near-surface travel time between the receptor positions, and differences in the near-surface travel time at the source. Referring more particularly to FIG. 1, after the recorded seismic wave traces have been corrected for normal moveout, the arrival time for the seismic wave 24 will differ from the arrival time for the seismic wave 26 by a time difference attributable to the dip between the adjoining basement points "A" and "B" of the interface 16, the effect of the near-surface layer under the source 18 through which the seismic wave 24 travels, the effect of the near-surface layer under the source 18 through which the seismic wave 26 travels, the effect of the near-surface layer under the receptor 20 through which the seismic wave 24 travels, and the effect of the near-surface layer under the receptor 22 through which the seismic wave 26 travels.

It will be apparent to those skilled in the art that the relative distances between the earth's surface 10, the lower extremity of the near-surface layer 12 and the subsurface interface 16 are greatly exaggerated in FIG. 1, and have been so exaggerated for the purpose of clarity in describing the method and apparatus of the present invention. In actual practice, the subsurface interface 16 is disposed at a distance below the earth's surface 10 which is sufficiently large that the travel paths of the seismic waves 24 and 26 through the near-surface layer generally beneath the source 18 are substantially coincident, thereby cancelling the difference in the near-surface layer 12 effect between the seismic waves 24 and 26 beneath the source 18 when determining a difference in travel time between the seismic waves 24 and 26 after such seismic waves have been corrected for normal moveout. Therefore, the difference between the near-surface layer 12 effect beneath the receptor position 22 and the near-surface layer 12 effect beneath the receptor position 20 can be expressed algebraically as follows:

$$W_{22} - W_{20} = (T_{B22} - T_{A20}) - D_{AB} \tag{1}$$

Wherein:

$W_{22}$ = The effect of the near-surface layer 12 on the seismic wave travel time therethrough generally beneath the receptor 22 position, expressed in seconds;

$W_{20}$ = The effect of the near-surface layer 12 on the seismic wave travel time therethrough generally beneath the receptor 20 position, expressed in seconds;

$T_{A20}$ = The total seismic wave travel time, corrected for normal moveout of the seismic wave 24 from the source 18 to the receptor 20 position reflected at basement point A, expressed in seconds;

$T_{B22}$ = The total seismic wave travel time, corrected for normal moveout, of the seismic wave 26 from the source 18 to the receptor 22 position reflected at basement point B, expressed in seconds; and $D_{AB}$ = The difference in seismic wave travel time, corrected for normal moveout, between the seismic wave 24 and the seismic wave 26 due to dip between the adjoining basement points "A" and "B".

Since $T_{A20}$ and $T_{B22}$ are determinable from the recorded seismic wave traces, it is apparent that the difference, expressed in time, between the near-surface 12 effect at receptor 22 position and the near-surface 12 effect at receptor 20 position can be determined utilizing the above equation (1) if the dip factor $D_{AB}$ were known.

It is the practice in the geophysical prospecting art to record a plurality of seismic wave traces utilizing a source of seismic energy disposed at various positions on the earth's surface and utilizing in cooperation therewith a plurality of receptors, the position of the receptors being changed in accordance with or relative to the change in position of the seismic energy source. It is apparent that the method of geophysical prospecting generally described above, yields a large amount of redundant data relative to a particular basement point and relative to seismic wave travel through a particular portion of the near-surface layer. This method of geophysical prospecting is partially shown in a diagrammatical form in FIG. 2.

As shown in FIG. 2, the source 18 has generated the seismic waves 24 and 26 reflected from the adjoining basement points "A" and "B," in a manner as described before with respect to FIG. 1. However, as shown in dashed-lines in FIG. 2, the source 18 has also been positioned at a different location on the earth's surface 10, and in that position, the source 18 has generated additional seismic waves 30 and 32, also shown in dashed-lines in FIG. 2.

As shown in FIG. 2, the seismic wave 30 is reflected from the basement point "B," and the recorded seismic wave trace thereof is recorded by the receptor 20. The seismic wave 32 is reflected from a basement point, designated in FIG. 2 by the letter "C," and the recorded seismic wave trace thereof is recorded by the receptor 22. It will be apparent to those skilled in the art that the receptors 20 and 22 shown in FIGS. 1 and 2, more particularly designate receptor locations or receptor positions 20 and 22 on the earth's surface 10. By the same token, it will be apparent to those skilled in the art that the sources 18 shown in FIGS. 1 and 2, more particularly designate source locations or source positions 18 on the earth's surface 10.

From the foregoing explanation relating to the derivation of the algebraic expression (1) above, it is apparent that a second expression may be derived to express the difference between the effect of the near-surface layer 12 beneath the receptor 22 position and the near-surface layer 12 effect generally beneath the receptor 20 position, utilizing the seismic data diagrammatically shown in FIG. 2. The algebraic expression expressing this difference will then be as follows:

$$W_{22} - W_{20} = (T_{C22} - T_{B20}) - D_{BC} \qquad (2)$$

Wherein:

$W_{22}$ = The effect of the near-surface layer 12 on the seismic wave travel time therethrough generally beneath the receptor 22 position, expressed in seconds;

$W_{20}$ = The effect of the near-surface layer 12 on the seismic wave travel time therethrough generally beneath the receptor 20 position, expressed in seconds;

$T_{B20}$ = The total seismic wave travel time, corrected for normal moveout, of the seismic wave 30 from the source 18 position to the receptor 20 position reflected at basement point "B," expressed in seconds;

$T_{C22}$ = The total seismic wave travel time, corrected for normal moveout, of the seismic wave 32 from the source 18 position to the receptor 22 position reflected at basement point "C," expressed in seconds; and $D_{BC}$ = The difference in seismic travel time, corrected for normal moveout, between the seismic wave 30 and the seismic wave 32 due to dip between the adjoining basement points "B" and "C."

In geophysical prospecting in the nature as generally described above with respect to FIGS. 1 and 2, it is also a general practice to utilize a plurality of receptor positions, or in other words, to vary the receptor position while maintaining the source position constant. Thus, two sets of seismic data, common source and receptor, are obtained, both yielding redundant data relative to the near-surface layer effect 12 under various predetermined locations on the earth's surface 10.

The recorded seismic wave traces, obtained in a manner as described above, that is varying receptor positions while maintaining a source position constant and varying the source positions while maintaining the receptor positions constant, and the resultant data obtained from the seismic wave traces is then correlated.

TABLE I

| | | | | | | | | | | |
|---|---|---|---|---|---|---|---|---|---|---|
| x | x | x | x | A | B | x | x | x | x | x |
| x | x | x | x | $a_1$ | $b_1$ | x | | | | |
| | x | x | x | $a_2$ | $b_2$ | x | x | | | |
| | | x | x | $a_3$ | $b_3$ | x | x | x | | |
| | | | x | $a_4$ | $b_4$ | x | x | x | x | |
| | | | | $a_5$ | $b_5$ | x | x | x | x | x |

In Table I above, the letter indications above each vertical column correspond to particular basement points on a particular subsurface interface. More particularly, as shown in Table I above, only the basement points "A" and "B" of the subsurface interface 16, shown in FIGS. 1 and 2, have been particularly shown, for the purpose of clarity of description. Listed below each basement point is a seismic wave travel time, corrected for normal moveout, expressed in seconds, of a particular recorded seismic wave trace with respect to a particular subsurface interface.

This particular step in the method of the present invention will be more particularly described with respect to the basement points "A" and "B" of the interface 16, as shown in FIGS. 1 and 2, and therefore the seismic wave travel times relative to other basement points in Table I have been designated therein with an "asterisk," it being understood that in actual practice each "asterisk" will of course be replaced by the appropriate seismic wave travel time or the particular basement point, as will become more apparent below.

As shown in Table I, listed under the basement point "A" are five seismic wave travel times, designated in Table I as $a_1, a_2, a_3, a_4$ and $a_5$. Under the basement point "B", in Table I, are listed five seismic travel times, designated therein as $b_1, b_2, b_3, b_4$ and $b_5$.

Since the seismic wave travel times shown in Table I have been corrected for normal moveout, it follows that any difference between the travel time "A" and the travel time "B" with respect to a common receptor position should be equal to the dip or the relative dip between the adjoining basement points "A" and "B." However, as mentioned before, the correction for normal moveout has assumed, among other things, a particular velocity parameter or component relative to the near-surface layer 12 beneath the various receptor and source positions.

Utilizing the method of the present invention, it is apparent from Table I that a predetermined number of time difference values between "A" and "B" are available. Therefore, the time difference between the basement points "A" and "B" due to dip can now be more accurately determined by summing and averaging the various differences obtained from the time values shown in Table I. Expressed algebraically, the time differences due to dip between the two basement points, "A" and "B" are thus determined utilizing the following algebraic expressions:

$$a_1 - b_1 = U \qquad (3)$$

$$a_2 - b_2 = V \qquad (4)$$

$$a_3 - b_3 = W \qquad (5)$$

$$a_4 - b_4 = X \qquad (6)$$

$$a_5 - b_5 = Y \qquad (7)$$

Wherein:

$a_1, a_2, a_3, a_4$ and $a_5$ are the travel times listed under basement point "A" in Table I, and $b_1, b_2, b_3, b_4$ and $b_5$ are the travel times listed under basement point "B" in Table I. Thus from algebraic expressions (3), (4), (5), (6) and (7), above, a predetermined number of differences in time between the two adjoining basement points "A" and "B" are determined. Those differences are designated in the above equations as $U, V, W, X$ and $Y$. It should also be noted that the time lag representing the differences expressed in equations (3), (4), (5), (6) and (7) above is generally designated in the art and will be referred to below, by the symbol $\tau$.

In the present method, the arithmetic means, sometimes referred to below as the "dip arithmetic means," of the differences thus determined is calculated or determined, and the determined dip arithmetic mean represents a statistically corrected value for the difference in time due to dip between the two adjacent basement points "A" and "B," referred to above and below as $D_{AB}$. Algebraically expressed and utilizing the example as shown in Table I, wherein five time differences were illustrated, $D_{AB}$ is statistically determined as follows:

$$D_{AB} = \frac{U+V+W+X+Y}{5} \qquad (8)$$

As mentioned before, seismic field data is generally obtained utilizing a number of source positions relative to a predetermined number of receptor positions, and utilizing a number of receptor positions relative to a predetermined source position. It is therefore apparent that Table I above, represents only a small portion of the field data contemplated by the present invention to be utilized in determining the near-surface static corrections to be applied to recorded seismic wave traces. In view of the above, the dip arithmetic mean of the differences in travel time between seismic waves reflected from adjoining basement points, after such seismic waves have been corrected for normal moveout, may be determined for each set of data in a manner generally as utilized in the determination of equation (8), above.

Utilizing above algebraic expression (8), the difference in travel time of seismic waves corrected for normal moveout reflected from adjoining basement points "A" and "B" is determined or, in other words, the correction factor, expressed in time, due to dip between the two adjoining basement points "A" and "B" is statistically determined. It will be apparent to those skilled in the art, that the correction factor, expressed in time, between any two adjoining basement points due to dip, is thus obtainable utilizing the method generally described above for obtaining "$D_{AB}$," illustrated by the algebraic expression (8). Assuming the dip factors for the various adjoining basement points such as, for example, the dip between the adjoining basement points "B" and "C" or "$D_{BC}$" is thus determined.

The dip corrections for the adjoining basement points under investigation are then utilized in the algebraic expressions (1) and (2) to obtain a predetermined number of values for "$W_{22} - W_{20}$." In other words, a predetermined number of time values are determined, each time value representing the difference between the effect of the near-surface layer 12 beneath two determined receptor positions.

It is apparent from the foregoing that more than one value for the differences in the effect of the near-surface layer 12 beneath determined receptor positions is determined, the particular number of values depending upon the number of source positions and the number of receptor positions utilized in the particular geophysical prospecting application.

For example, if $k$ sources are available to generate seismic waves for the receptor positions 20 and 22, as indicated in FIGS. 1 and 2, the arithmetic mean or the average difference between the effect of the near-surface layer 12 generally beneath the receptor 22 position and the near-surface layer 12 effect generally beneath the receptor 20 position can be determined utilizing the following algebraic expression:

$$\overline{W}_{22} - \overline{W}_{20} = \frac{1}{k}\sum_{1}^{k}(W_{22} - W_{20}) \qquad (9)$$

Wherein:

$\overline{W}_{22} - \overline{W}_{20}$ equals the time correction factor or, more particularly, the statistical average difference between the effect of the near-surface layer 12 generally beneath the receptor 22 position and the effect of the near-surface layer 12 generally beneath the receptor 20 position.

Utilizing the algebraic expression (9), the statistical average difference between the effect of the near-surface layer under two adjoining receptor positions is determined, the correction for dip between the adjoining basement points having been previously removed in the step of the present method represented by algebraic expressions (1) and (2).

It is apparent from the foregoing that by using common receptor positions and adjoining source positions, in a manner similar to that described above with respect to common source positions and adjoining receptor positions, an additional set of statistical values utilizing a different set of field data, is determined for the same surface positions. In other words, an additional set of statistical values for $\overline{W}_{22} - \overline{W}_{20}$ are determined utilizing common receptor positions and adjoining source positions. This second set of statistical data is then averaged with the first set of statistical data obtained utilizing the step of the present method represented by the algebraic expression (9) above, thereby more nearly or more accurately determining the value of $\overline{W}_{22} - \overline{W}_{20}$.

After determining the difference in time due to the effect of the near-surface layer between the adjoining surface or receptor positions, these values are then utilized to shift the recorded wave traces. In accordance with the above described method, a time static correction factor is thus determined for each source position and each receptor position utilized in a particular time-section being analyzed. In analyzing the composite recorded seismic wave traces or a time-section, it is the relative position of a particular peak or, in other words, the relative position of a particular recorded seismic wave trace with respect to the other recorded seismic wave traces that becomes critical. In view of this, an initial reference value is assigned or, in some instances, may be measured experimentally at a starting surface position for one particular recorded seismic wave trace. The time correction factors are then added or subtracted from the preceding value to determine a near-surface correction for each surface receptor position and each surface source position. In short, the near-surface correction value for each source and each receptor position is then utilized to statistically adjust or shift the recorded seismic wave trace. The total static correction for each recorded seismic wave trace may thus be expressed algebraically as follows:

$$\overline{T}_{ij} = (\overline{R}_{ij} + \overline{S}_{ij}) \qquad (10)$$

Wherein:

$i = 1, \ldots, n;$ and $\qquad$ (11)

$j = 1, \ldots, t.$ $\qquad$ (12)

Wherein:

$\overline{R}_{ij} =$ The average static correction at the receptor of the trace $j$, produced by the source $i$;

$\overline{S}_{ij} =$ The average static correction at the source, $i$, for the trace $j$;

$\overline{T}_{ij} =$ The total static correction for the particular recorded wave trace;

$n =$ The number of source positions; and $t =$ The number of traces per source position.

Thus, the steps in the above described method determine a total time static correction factor for each recorded seismic wave trace ($\overline{T}_{ij}$). As mentioned before, each recorded seismic wave trace was initially corrected for normal moveout prior to determining the effect of the near-surface layer 12 and the effect due to dip between two adjoining basement points on a particular interface 16. The correction for normal moveout utilized a particular velocity component which was determined from prior field experience or other empirical data available for the area under investigation. Since the total time static correction factor ($\overline{T}_{ij}$) has now been determined, in a manner as described above, for each recorded seismic wave trace or, in other words, each position on the earth's surface where a particular seismic wave trace is being recorded, the total time static correction factor ($\overline{T}_{ij}$) can now be utilized to more accurately correct each recorded seismic wave trace for normal moveout.

After each recorded seismic wave trace has been corrected for normal moveout utilizing the determined total time static correction ($\overline{T}_{ij}$) for each particular recorded wave trace, the steps described before to determine the calculated or determined $\overline{T}_{ij}$ are repeated, thereby determining a new or subsequent time static correction for each reflected seismic wave trace which may be designated by the symbol $\overline{T}_{ij}$.

It is apparent from the foregoing that the repeated determinations of a time static correction factor and subsequent utilization of the previously determined total time static correction factor to derive new corrections to correct for normal moveout prior to again determining a subsequent total time static correction factor will yield, in the final analysis, a total time static correction for each recorded wave trace which has been statistically determined in a manner more accurately considering the effect of the near-surface layer and considering the dip of a particular interface. The last determined time static correction factor is then utilized to correct the recorded seismic wave traces in the time-section.

Once the field data has been determined, that is once the recorded seismic wave traces have been determined utilizing common receptor positions and adjoining source positions and utilizing common source positions and adjoining receptor positions, it is apparent that the above described method utilized to determine a total time static correction factor for each recorded seismic wave trace could be easily performed in a machine process as performed by automatic data processing equipment, such as, for example, on a digital type computer. Utilizing a machine process, it is apparent that the steps of the method to determine the total time static correction for each recorded seismic wave trace and utilizing that determined total time static corrector factor to derive corrections for normal moveout, and subsequently repeating the steps to determine a subsequent total time static correction factor could be repeated a predetermined number of times until conveniently the total time static corrections were as statistically accurate as desired in a particular application.

As mentioned above, the method of the present invention is particularly applicable to a digital type computer, however, as shown in FIG. 3, analog apparatus can be constructed to determine the total time static corrections to be applied to particular recorded seismic wave traces utilizing the method of the present invention, as described above.

The analog apparatus, as shown in FIG. 3, is adapted to utilize or consider only three adjacent basement points, "A," "B" and "C," as shown in FIG. 2, for the purpose of clarity of description. However, it will be apparent to those skilled in the art, that by adding a sufficient amount of networks, any number of basement points can be utilized and any number of differences in near-surface effects can be determined, as will become more apparent below.

As shown in FIG. 3, the various seismic wave travel times corresponding to a common source position and reflected from the common basement point "A" of the interface 16, shown in FIG. 2, are connected to the input of a correlator 40 via a signal path 42. Also as shown in FIG. 3, the seismic wave travel times corresponding to a particular source location and being reflected from the common basement point "B" of the interface 16 are connected to the input of the correlator 40 via the signal path 44. The correlator 40 is adapted to determine the differences between the seismic wave travel times in a manner as described above with respect to the equations (3), (4), (5), (6) and (7). It should be noted that the seismic wave travel times connected to the correlator 40 via the signal path 42 and 44 have been previously corrected for normal moveout, in a manner as described before. The output signal of the correlator 40, designated in FIG. 3 by the general reference numeral 46, therefore indicates a value for each difference correlated.

As shown in FIG. 3, the output signal 46 of the correlator 40 is connected to the input of a mean determination network 48, and the output signal 46 is also connected to a difference network 50 via a signal path 52 which is paralleled around the mean determination network 48. The mean determination network 48 is adapted to sum the $\tau$ values and to utilize a predetermined number of fold stack to determine an arithmetic mean of the differences, in a manner similar to that described before with respect to the algebraic expression (8) above. It is apparent from the foregoing that the number of fold stack, that is the value of $n$, must be pre-set or encoded in the mean determination network 48 for the particular seismic data being evaluated.

The output signal of the mean determination network 48, designated in FIG. 3 by the general reference 54, represents the difference in seismic wave travel time due to dip between the basement points "A" and "B" or, in other words and following the example utilized above "$D_{AB}$". The output signal 54 is connected to the input of the differential network 50.

The differential network 50 is adapted to utilize the input signal 52 and the input signal 54 to determine the difference between the effect of the near-surface layer beneath the receptor 22 position and the effect of the near-surface layer beneath the receptor 20 position, in a manner as described before with respect to the algebraic expression (1).

The output signal, designated in FIG. 3, by the general reference numeral 56, of the difference network 50 is thus indicative of the value of $(W_{22} - W_{20})$ as described before with respect to the algebraic expression (1). The output signal 56 of the difference network 50 is connected to the input of a mean determination network designated in FIG. 3 by the general reference numeral 58, sometimes referred to below as the total mean determination network.

As shown in FIG. 3, the analog network includes a second correlator 60, a second mean determination network 62 and a second difference network 64. The correlator 60, the mean determination network 62 and the difference network 64 are adapted to cooperate to determine the difference between the effect of the near-surface layer beneath the receptor 22 position and the effect of the near-surface layer generally beneath the receptor 20 position, that is to determine a predetermined number of values for $(W_{22} - W_{20})$, in a manner similar to the correlator 40, the mean determination network 48 and the difference network 50, as described before. It should be particularly noted, however, that the correlator 60, the mean determination network 62 and the difference network 64 determine a time value for the quantity $(W_{22} - W_{20})$ utilizing a different set of adjoining basement points of the interface 16. More particularly and following the example utilized above, this combination of network components referred to above, determines a value for the quantity $(W_{22} - W_{20})$ utilizing the adjoining basement points "B" and "C."

As shown in FIG. 3, the various seismic wave travel times corresponding to a common source position and reflected from the common basement point "B" of the interface 16, shown in FIG. 2, are connected to the input of the correlator 60 via a signal path 66. The seismic wave travel times corresponding to a particular source location and being reflected from the common basement point "C" of the interface 16 are connected to the input of the correlator 66 via the signal path 68. The correlator 60 is adapted to determine the differences between the seismic wave travel times in a manner as described above with respect to the equations (3), (4), (5), (6) and (7), but particularly adapted to relate to the basement points "B" and "C." The output signal of the correlator 60, designated in FIG. 3 by the general reference numeral 70, therefore indicates a $\tau$ value for each difference correlated.

As shown in FIG. 3, the output signal 70 of the correlator 60 is connected to the input of the mean determination network 62 and the output signal 70 is also connected to the difference network 64 via a signal path 72 which is paralleled around the mean determination network 62.

The mean determination network 62 is adapted to sum the $\tau$ values and to utilize the predetermined number of fold stack to determine an arithmetic mean of the differences, in a manner similar to that described before with respect to the algebraic expression (8), particularly related to the basement points "B" and "C". The number of fold stack, that is the value of $n$, would be encoded in the mean determination network 64 in a manner similar to that described before with respect to the mean determination network 48, described before.

The output signal of the mean determination network 64, designated in FIG. 3 by the general reference 74, represents the difference in seismic wave travel time due to dip between the basement points "B" and "C", or in other words, "$D_{BC}$". The output signal 74 is connected to the input of the difference network 64. The difference network 64 is adapted to utilize the input signal 72 and the input signal 74 to determine the difference between the effect of the near-surface layer beneath the receptor 22 position and the effect of the near-surface layer beneath the receptor 20 position, in a manner as described before with respect to the difference network 50, but particularly related to the basement points "B" and "C".

The output signal, designated in FIG. 3 by the general reference numeral 76, of the difference network 64 is thus indicative of the value of ($W_{22} - W_{20}$), and is connected to the mean determination network 58.

The mean determination network 58 thus receives input signals 56 and 76 which correspond to or indicate time values for ($W_{22} - W_{20}$), the signal 56 of course relating to values determined relative to the basement points "A" and "B", and the signal 76 relating to values determined relative to the basement points "B" and "C". The mean determination network 58 is adapted to determine the arithmetic mean of the values placed therein via the input signals 56 and 76, and is thus adapted to provide an output signal 80 which is indicative of the statistical average difference ($\overline{W}_{22} - \overline{W}_{20}$), in a manner similar to that described with respect to the algebraic expression (9), above.

The output signal 80 of the mean determination network 58 is connected to the input of a summation network 82. The summation network 82 is adapted such that the output signal thereof, designated in FIG. 3 by the reference numeral 84, indicates the total time static correction to be applied to each recorded seismic wave trace. It is apparent from the foregoing, that the summation network 82 is adapted to provide a total static correction factor ($\overline{T}_{ij}$) in a manner as described before with respect to the algebraic expression (10).

Although the analog apparatus, as shown in FIG. 3, is adapted to provide a total static correction factor ($\overline{T}_{ij}$) utilizing only three basement points, "A," "B," and "C," as shown in FIG. 2, it will be apparent to those skilled in the art that by adding a sufficient amount of networks that any number of basement points can be utilized and any number of differences in near-surface effects can be determined therefrom. It is also apparent from the foregoing that the output signal 84 of the summation network 82 could be adapted to be connected to the apparatus generating the input signals 42, 44, 66 and 68, and to correct those input signals for normal moveout in accordance with the calculated total time static correction factor ($\overline{T}_{ij}$), and thereby repeat the above described steps to determine a new or subsequent, more statistically accurate total time static correction factor.

It should be noted that the particular construction of the various networks and components described above relative to the analog apparatus shown in FIG. 3, considering the above detailed description, is well known in the art and a detailed description of the various specific component parts and the electrical interconnections therebetween is not necessary herein.

Figure 4A:
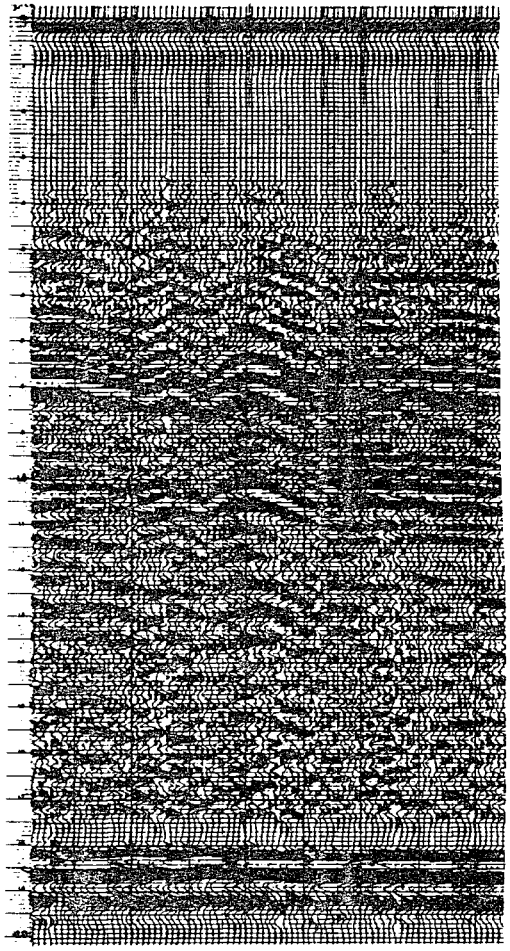
FIG. 4A is an actual "time-section" showing a number of seismic wave traces prior to static corrections being applied thereto.

Shown in FIG. 4A is a time-section representing a plurality of recorded seismic wave traces obtained in an actual field experiment, before the total static correction factors ($\overline{T}_{ij}$), determined in accordance with the method or apparatus of the present invention, have been applied thereto. It will be readily apparent to one skilled in the art, that not only do particular seismic-traces indicate a particular non-horizontally oriented interface, but also that there is an area of the time-section where the peaks do not readily match. In other words, there is an area indicated by this particular time-section which might be interpreted to indicate a fault in the lithology being studied, or might at least cause a fictitious interpretation indicating a fictitious interface orientation.

Figure 4B:
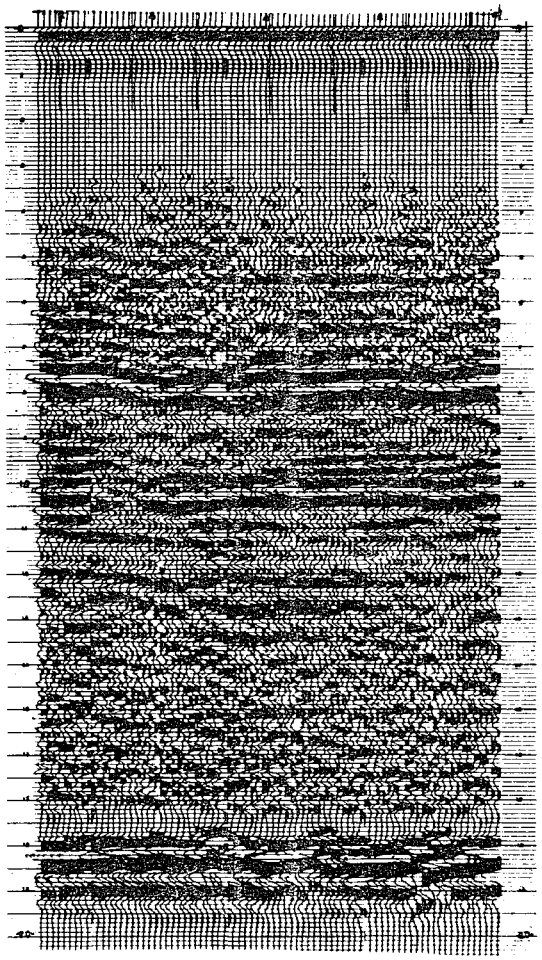
FIG. 4B is the "time-section" of FIG. 4A, but showing the seismic wave traces after being corrected in accordance with the present invention.

Shown in FIG. 4B is the same time-section as shown in FIG. 1, except that the recorded seismic wave traces of FIG. 4B have been statically corrected utilizing a total static correction factor determined in accordance with the method of the present invention. Comparing the time-section of FIG. 4A with the time-section of of FIG. 4B, it will be readily apparent that the interpretative data provided by the time-section has been considerably improved, and that, in fact, no fault is indicated in the lithology and the particular subsurface interfaces are readily traceable.

Also shown in FIG. 4B, and designated therein as a "-correction profile" is a plot of total static correction factor determined in accordance with the present invention at various positions along the earth's surface. From the correction profile, shown in FIG. 4B, it will be readily observed that the particular static correction factor to be applied to a recorded seismic wave trace varies considerably with respect to various positions on the earth's surface and, in some instances, is of such a sufficient value that the particular recorded seismic wave trace could easily lead to a fictitious interpretation of the particular time-section.

Figure 5A:
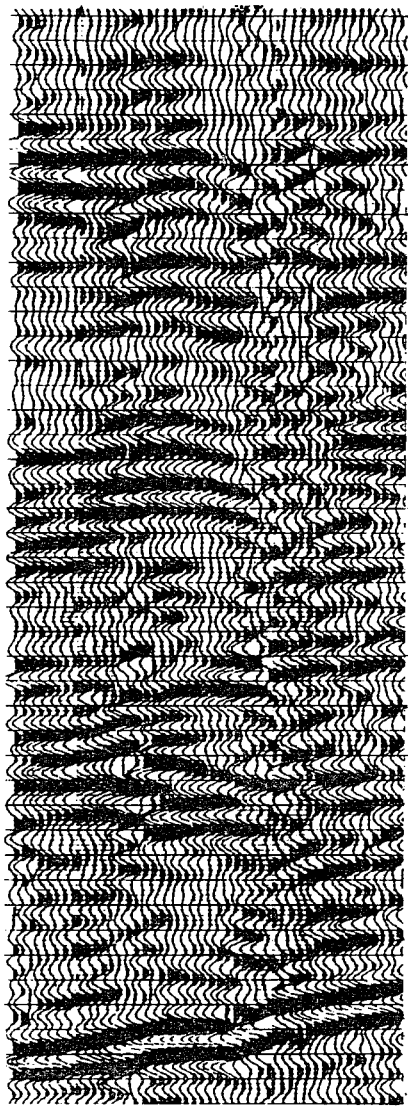
FIG. 5A is an actual "time-section" showing a number of seismic wave traces prior to static corrections being applied thereto.

Another time-section is shown in FIG. 5A before the total static correction factors determined in accordance with the present invention have been applied thereto. It will be apparent to those skilled in the art that the time-section shown in FIG. 5A could easily lead to an erroneous interpretation, similar to the uncorrected time-section shown in FIG. 4A.

Figure 5B:
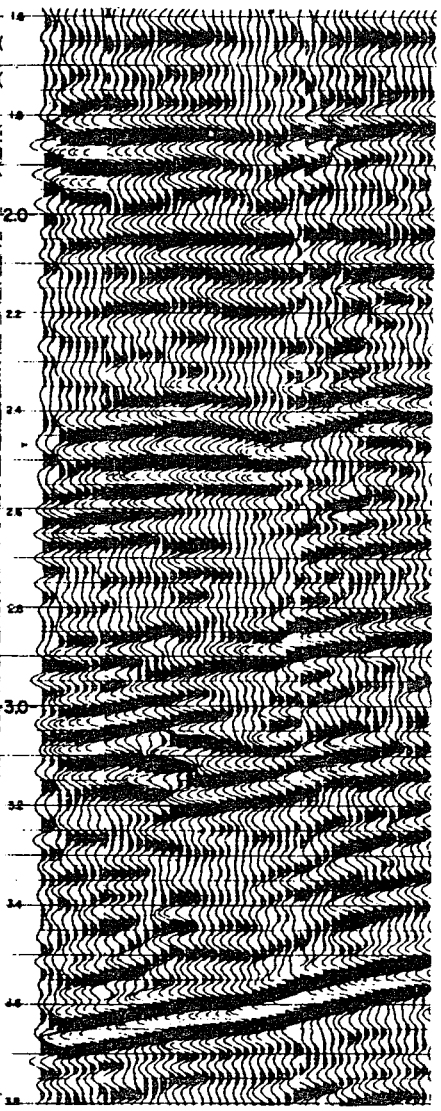
FIG. 5B is the "time-section" of FIG. 5A, but showing the seismic wave traces after being corrected in accordance with the present invention.

Shown in FIG. 5B, is the time-section of FIG. 5A after the static corrections have been applied thereto. It is apparent from FIG. 5B, that by applying the total static correction factor as determined by the method of the present invention, the particular time-section being studied yields interpretative data which minimizes the opportunity for erroneous interpretation thereof and more accurately reflects the true lithology being studied.

From the foregoing, it will be apprent to those skilled in the art that the method and apparatus of the present invention provides a relatively speedy, efficient, economical and accurate method for determining the total static correction factor to be applied to recorded seismic wave traces wherein the effect of the near-surface layer and the effect of the dip between adjacent basement points are statistically-accurately determined and utilized to determine a more accurate total static correction factor. It is also apparent from the foregoing, that although the method and apparatus have been described with respect to a relatively simple lithology, that the method and apparatus apply equally well to a more complex lithology.

Changes may be made in the various component parts or elements of the apparatus or in the various steps of the method as described herein without departing from the spirit and scope of the invention as defined in the following claims.

What is claimed is:

1. A method for determining the time static correction factor for the near-surface layer effect beneath predetermined positions on the earth's surface from seismic data obtained utilizing a predetermined number of receptor positions and a predetermined number of source positions to obtain a plurality of seismic waves reflected from various predetermined adjoining basement points, the steps of the method comprising:

correcting each recorded seismic wave trace for normal moveout;
   determining a plurality of time differences between the recorded seismic wave traces reflected from predetermined adjoining basement points and recorded at predetermined positions on the earth's surface;
   determining the dip arithmetic mean of the time differences between the recorded seismic wave traces reflected from the predetermined adjoining basement points;
   determining a plurality of time differences between the dip arithmetic mean and each difference between recorded seismic wave traces reflected from adjoining basement points and recorded at the predetermined positions on the earth's surface to determine a plurality of time differences between the near-surface layer layer effect beneath the predetermined positions on the earth's surface; and
   determining the arithmetic mean of the time differences between the near-surface layer effect beneath the predetermined positions on the earth's surface to determine the time static correction factor.

2. The method of claim 1 wherein the steps of the method are defined further to include:

correcting each recorded seismic wave trace for normal moveout utilizing the determined time static correction factor; and
   repeating the steps of the method to determine a subsequent time static correction factor utilizing the seismic wave traces corrected for normal moveout utilizing the previously determined time static correction factor.

3. The method of claim 2, wherein the steps are defined further to include:

determining a predetermined number of subsequent time static correction factors, the last determined time static correction factor being utilized as the time static correction factor between the near-surface layer effect beneath the predetermined positions on the earth's surface.

4. A method for determining the time static correction factor for the near-surface layer effect beneath predetermined positions on the earth's surface from seismic data obtained utilizing a predetermined number of receptor positions and a predetermined number of source positions to obtain a plurality of seismic waves reflected from a plurality of adjoining basement points, the steps of the method comprising:

correcting each recorded seismic wave trace for normal moveout;
   determining a plurality of time differences between the recorded seismic wave traces reflected from two predetermined adjoining basement points, and recorded at two predetermined receptor positions on the earth's surface;
   determining the dip arithmetic mean of the time differences between the recorded seismic wave traces reflected from the two predetermined adjoining basement points;
   determining a plurality of time differences between the dip arithmetic mean and each time difference between recorded seismic wave traces reflected from the two predetermined adjoining basement points and recorded at the two predetermined receptor positions on the earth's surface, to determine a plurality of time differences between the near-surface layer effect beneath the two predetermined receptor positions on the earth's surface;
   determining a plurality of time differences between seismic wave traces reflected from two other predetermined adjoining basement points and recorded at the two predetermined receptor positions on the earth's surface;
   determining the dip arithmetic mean of the time differences between the recorded seismic wave traces reflected from the two other predetermined adjoining basement points;
   determining a plurality of time differences between the dip arithmetic mean and each time difference between recorded seismic wave traces reflected from the two other predetermined adjoining basement points recorded at the two predetermined receptor positions on the earth's surface, to determine a plurality of time differences between the near-surface layer effect beneath the two predetermined receptor positions on the earth's surface; and
   determining the arithmetic mean of the time differences between the near-surface layer effect beneath the two predetermined receptor positions on the earth's surface, some of the differences corresponding to the two predetermined adjoining basement points and some of the differences corresponding to the two other predetermined adjoining basement points, to determine the time static correction factor.

5. A method for determining a total time static correction factor for recorded seismic wave traces in a time-section from seismic data obtained utilizing a predetermined number of receptor positions and a predetermined number of source positions, the various receptor positions and the various source positions being altered such that at predetermined times some of the receptor positions correspond to the source positions, to obtain a plurality of seismic waves reflected from various predetermined adjoining basement points, the steps of the method, comprising:

correcting each recorded seismic wave trace for normal moveout;

determining a plurality of time differences between the recorded seismic wave traces reflected from predetermined adjoining basement points, and recorded at predetermined positions on the earth's surface;

determining the dip arithmetic mean of the time differences between the recorded seismic wave traces reflected from the predetermined adjoining basement points;

determining a plurality of time differences between the dip arithmetic mean and each time difference between recorded seismic wave traces reflected from adjoining basement points and recorded at the predetermined positions on the earth's surface, to determine a plurality of time differences between the near-surface layer effect beneath the predetermined positions on the earth's surface;

determining the arithmetic mean of the time differences between the near-surface layer effect beneath the predetermined positions on the earth's surface to determine the time static correction factor with respect to the predetermined position on the earth's surface;

repeating the above steps to determine a time static correction factor for each source position and each receptor position utilized in the time-section; and determining the sum of the time static correction factors for the particular source position and the particular receptor position for each recorded seismic wave trace in the time-section, to determine the total time static correction factor for each recorded seismic wave trace in the time-section.

6. The method of claim 5 wherein the steps of the method are defined further to include:

correcting each recorded seismic wave trace for normal moveout utilizing the determined total time static correction factor; and repeating the steps of the method to determine a subsequent total time static correction factor utilizing the seismic wave traces corrected for normal moveout utilizing the previously determined total time static correction factor.

7. The method of claim 6, wherein the steps of the method are defined further to include:

determining a predetermined number of subsequent total time static correction factors, the last determined total time static correction factor being utilized to correct the recorded seismic wave traces of the time-section.

8. Apparatus for determining the time static correction factor for the near-surface layer effect beneath predetermined positions on the earth's surface from seismic data obtained utilizing a predetermined number of receptor positions and a predetermined number of source positions to obtain a plurality of seismic waves reflected from various predetermined adjoining basement points, the travel time of each seismic wave trace having been corrected for normal moveout, comprising:

a correlator adapted to receive a plurality of corrected seismic wave travel times reflected from predetermined adjoining basement points via signal input paths and to determine the time differences between the corrected seismic wave travel times reflected from predetermined adjoining basement points and recorded at predetermined positions on the earth's surface and to provide an output signal corresponding to each determined time difference;

a mean determination network adapted to receive the time differences from the correlator and to determine the dip arithmetic mean of the time differences and to provide an output signal corresponding to the determined dip arithmetic mean;

a difference network adapted to receive the signal output of the correlator and the signal output of the mean determination network and to determine a plurality of time differences between the dip arithmetic mean and each time difference determined by the correlator and to provide a signal output corresponding to each time difference determined by the difference network; and a mean determination network adapted to receive the signal output of the difference network and determine the arithmetic mean of the time differences determined by the difference network, the arithmetic mean determined by the last mentioned mean determination network being the time static correction factor.

9. Apparatus for determining the time static correction factor for the near-surface layer effect beneath predetermined positions on the earth's surface from seismic data obtained utilizing a predetermined number of receptor positions and a predetermined number of source positions to obtain a plurality of seismic waves reflected from a plurality of adjoining basement points, the travel time of each seismic wave trace having been corrected for normal moveout, comprising:

a first correlator adapted to receive a plurality of corrected seismic wave travel times reflected from two predetermined adjoining basement points via signal input paths and to determine the time differences between the corrected seismic wave travel times reflected from the two predetermined adjoining basement points, and recorded at two predetermined receptor positions on the earth's surface and provide an output signal corresponding to each determined time difference;

a first mean determination network adapted to receive the time differences from the first correlator and to determine the dip arithmetic mean of the time differences and to provide an output signal corresponding to the determined dip arithmetic mean;

a first difference network adapted to receive the signal output of the first correlator and the signal output of the first mean determination network and to determine a plurality of time differences between the dip arithmetic mean and each difference determined by the first correlator and to provide a signal output corresponding to each time difference determined by the first difference network;

a second correlator adapted to receive a plurality of corrected seismic wave travel times reflected from two other predetermined adjoining basement points via signal input paths and to determine the time differences between the corrected seismic wave travel times reflected from the two other predetermined adjoining basement points and recorded at the two predetermined receptor positions on the earth's surface;

a second mean determination network adapted to receive the time differences from the second correlator and to determine the dip arithmetic mean of the time differences between the recorded seismic wave traces reflected from the two other predetermined adjoining basement points and to provide an output signal corresponding to the determined dip arithmetic mean;

a second difference network adapted to receive the signal output of the second correlator and the signal output of the second mean determination network and to determine a plurality of time differences between the dip arithmetic mean determined by the second mean determination network and each difference determined by the second correlator and to provide a signal output corresponding to each time difference determined by the second difference network; and a total mean determination network adapted to receive the signal output of the first difference network and the signal output of the second difference network and to determine the arithmetic mean of the time differences determined by the first difference network and the second difference network, the arithmetic mean determined by the total mean determination network being the time static correction factor beneath the two predetermined positions on the earth's surface.

10. In a machine process, as performed by automatic data processing equipment for determining the time static corrector factor for the near-surface layer effect beneath predetermined positions on the earth's surface from seismic data obtained utilizing a predetermined number of receptor positions and a predetermined number of source positions to obtain a plurality of seismic waves reflected from various predetermined adjoining basement points, the machine process comprising:

correcting each recorded seismic wave trace for normal moveout;

determining a plurality of time differences between the recorded seismic wave traces reflected from predetermined adjoining basement points and recorded at predetermined positions on the earth's surface;

determining the dip arithmetic mean of the time differences between the recorded seismic wave traces reflected from the predetermined adjoining basement points;

determining a plurality of time differences between the dip arithmetic mean and each time difference between recorded seismic wave traces reflected from adjoining basement points and recorded at the predetermined positions on the earth's surface to determine a plurality of time differences between the near-surface layer effect beneath the predetermined positions on the earth's surface;

determining the arithmetic mean of the time differences between the near-surface layer effect beneath the predetermined positions on the earth's surface to determine the time static correction factor;

correcting each recorded seismic wave trace for normal moveout utilizing the determined time static correction factor; and repeating the steps of the method to determine a subsequent time static correction factor utilizing the seismic wave traces corrected for normal moveout utilizing the previously determined time static correction factor.

11. The machine process of claim 10, further defined to include:

determining a predetermined number of subsequent time static correction factors, the last determined time correction factor being utilized as the time static correction between the near-surface layer effect beneath the predetermined positions on the earth's surface.

12. In a machine process, as performed by automatic data processing equipment for determining the time static correction factor for the near-surface layer effect beneath predetermined positions on the earth's surface from seismic data obtained utilizing a predetermined number of receptor positions and a predetermined number of source positions to obtain a plurality of seismic waves reflected from a plurality of adjoining basement points, the machine process comprising:

correcting each recorded seismic wave trace for normal moveout;

determining a plurality of time differences between the recorded seismic wave traces reflected from two predetermined adjoining basement points, and recorded at two predetermined receptor positions on the earth's surface;

determining the dip arithmetic mean of the time differences between the recorded seismic wave traces reflected from the two predetermined adjoining basement points;

determining a plurality of time differences between the dip arithmetic mean and each time difference between recorded seismic wave traces reflected from the two predetermined adjoining basement points and recorded at the two predetermined receptor positions on the earth's surface, to determine a plurality of time differences between the near-surface layer effect beneath the two predetermined receptor positions on the earth's surface;

determining a plurality of time differences between seismic wave traces reflected from two other predetermined and recorded at the two predetermined receptor positions on the earth's surface;

determining the dip arithmetic mean of the time differences between the recorded seismic wave traces reflected from the two other predetermined adjoining basement points;

determining a plurality of time differences between the dip arithmetic mean and each time difference between recorded seismic wave traces reflected from the two other predetermined adjoining basement points recorded at the two predetermined receptor positions on the earth's surface, to determine a plurality of time differences between the near-surface layer effect beneath the two predetermined receptor positions on the earth's surface; and determining the arithmetic mean of the time differences between the near-surface layer effect beneath the two predetermined receptor positions on the earth's surface, some of the differences corresponding to the two predetermined adjoining basement points and some of the differences corresponding to the two other predetermined adjoining basement points, to determine the time static correction factor.

13. In a machine process, as performed by automatic data processing equipment for determining a total time static correction factor for recorded seismic wave traces in a time-section from seismic data obtained utilizing a predetermined number of receptor positions and a predetermined number of source positions, the various receptor positions and the various source positions being altered such that at predetermined times some of the receptor positions correspond to subsequent source positions, to obtain a plurality of seismic waves reflected from various predetermined adjoining basement points, the machine process comprising:
   correcting each recorded seismic wave trace for normal moveout;
   determining a plurality of time differences between the recorded seismic wave traces reflected from predetermined adjoining basement points, and recorded at predetermined positions on the earth's surface;
   determining the dip arithmetic mean of the time differences between the recorded seismic wave traces reflected from the predetermined adjoining basement points;
   determining a plurality of time differences between the dip arithmetic mean and each time difference between recorded seismic wave traces reflected from adjoining basement points and recorded at the predetermined positions on the earth's surface, to determine a plurality of time differences between the near-surface layer effect beneath the predetermined positions on the earth's surface;
   determining the arithmetic mean of the time differences between the near-surface layer effect beneath the predetermined positions of the earth's surface to determine the time static correction factor with respect to the predetermined positions on the earth's surface;
   repeating the above steps to determine a time static correction factor for each source position and each receptor position utilized in the time-section; and
   determining the sum of the time static correction factors for the particular source position and the particular receptor position for each recorded seismic wave trace in the time-section, to determine the total time static correction factor for each recorded seismic wave trace in the time-section.

14. The machine process of claim 13 defined further to include:
   correcting each recorded seismic wave trace for normal moveout utilizing the determined total time static correction factor; and
   repeating the steps of the method to determine a subsequent total time static correction factor utilizing the seismic wave traces corrected for normal moveout utilizing the previously determined total time static correction factor.

15. The machine process of claim 14 defined further to include:
   determining a predetermined number of subsequent total time static correction factors, the last determined total time static correction factor being utilized to correct the recorded seismic wave traces of the time-section.

* * * * *